United States Patent [19]
Dhingra

[11] 3,869,339
[45] Mar. 4, 1975

[54] PREPARATION OF FLEXIBLE SHEETS OF POLYCRYSTALLINE ALUMINA-CONTAINING FIBERS

[75] Inventor: Ashok Kumar Dhingra, Claymont, Del.

[73] Assignee: E. I. du Pont de Nemours and Company, Wilmington, Del.

[22] Filed: Apr. 11, 1973

[21] Appl. No.: 350,127

[52] U.S. Cl......... 161/170, 117/70 A, 117/161 UB, 156/173, 156/174, 156/181, 161/182, 161/208, 161/256
[51] Int. Cl...................... B32b 27/04, B32b 27/12
[58] Field of Search ........... 161/170, 182, 208, 256; 117/70 A, 76 T, 161 UB, 72; 156/173, 174, 167, 181

[56] References Cited
UNITED STATES PATENTS

| | | | |
|---|---|---|---|
| 3,492,155 | 1/1970 | Baitsholts | 117/161 UB |
| 3,547,180 | 12/1970 | Cochran | 164/61 |
| 3,578,489 | 5/1971 | Gelb | 161/170 |
| 3,625,740 | 12/1971 | Hurley | 117/76 T |
| 3,700,535 | 10/1972 | McCoy | 161/47 |

FOREIGN PATENTS OR APPLICATIONS

| | | |
|---|---|---|
| 1,264,973 | 2/1972 | Great Britain |
| 1,199,376 | 7/1970 | Great Britain |
| 1,286,367 | 8/1972 | Great Britain |

*Primary Examiner*—George F. Lesmes
*Assistant Examiner*—Ellis P. Robinson
*Attorney, Agent, or Firm*—J. R. McGrath

[57] ABSTRACT

A flexible, integral sheet of polycrystalline alumina-containing fibers uniaxially aligned in a matrix of a substantially amorphous organic polymer having a glass transition temperature of 20°C. or less and a low modulus of elasticity. The flexible sheet is useful in the forming of fiber reinforced metal composites by placing it in a mold, burning off the organic polymer and infiltrating the resulting fiber skeleton with molten metal.

10 Claims, No Drawings

PREPARATION OF FLEXIBLE SHEETS OF POLYCRYSTALLINE ALUMINA-CONTAINING FIBERS

FIELD OF THE INVENTION

This invention relates to inorganic fibers in an organic polymer matrix. More specifically, the invention is directed to alumina-containing fibers aligned in certain organic polymer matrices to form a composite.

BACKGROUND OF THE INVENTION

Ceramic, or refractory oxide, fibers in the form of whiskers are well known, as is their use in polymer or metal matrices to reinforce or strengthen the polymer or metal. In order for the whiskers to maximize the strength of the polymer or metal, the whiskers should be aligned in parallel fashion and have their ends overlapped. This is difficult and expensive to achieve primarily due to the small size of the whiskers.

Recently, continuous filament alumina-containing refractory oxide fibers have been developed. However, as with all refractory oxide fibers they are somewhat brittle, and thus difficult to handle, especially in the preparation of reinforced metal matrices. In addition to this difficulty, the mechanical properties of these continuous filaments depends to a great extent on the number of surface flaws and defects in the filaments. It is, therefore, important to protect the filaments from abrasion, as well as breakage, during the preparation of the reinforced metal composite.

One method of protecting the continuous filaments is to embed them in an organic polymer matrix so the filaments can be handled and transferred with ease. It is important that the organic polymer matrix used be one that can be easily burned off with little residue, because once the filaments in the polymer matrix are laid-up into a mold, the polymer is ordinarily burned off and the remaining filament skeleton is then infiltrated with molten metal to form a reinforced metal matrix.

However, many organic polymers commonly used to form a matrix with the inorganic oxide whiskers are not adaptable for use with continuous filament alumina-containing refractory oxide fibers. For example, organic polymer matrices of polystyrene or Lucite generally result in brittle composites when used with the continuous filaments and cannot be bent to any great extent without breaking the filaments. This results in difficulty, especially in preparing the composite for lay-up into complex or curve-shaped molds. Thus, a need exists for an organic polymer matrix for use with the continuous filaments in which the organic polymer is soft, flexible and decomposable without residue at a relatively low temperature. Such an organic polymer, when so used, would result in a composite structure that would be flexible and handleable for use in curved molds, would protect the continuous filaments from abrasion and breakage, and would, when burned at relatively low temperatures, result in a skeleton of the continuous filaments with little or no residue of the organic polymer present. It is particularly important that the organic polymer be decomposable at a relatively low temperature, for high temperatures would result in grain growth or recrystallization in the continuous filament alumina-containing fibers which would affect their tensile properties.

It is the primary object of this invention to provide a composite of an organic polymer matrix and continuous filament alumina-containing refractory oxide fibers which have the advantages described above.

SUMMARY OF THE INVENTION

This invention provides a flexible, integral sheet of a composite consisting essentially of:

A. continuous filament polycrystalline refractory oxide fibers containing at least about 60% $Al_2O_3$ by weight and which have a fiber diameter of between about 5 and about 50 microns, said fibers being substantially uniaxially aligned in the composite and being present in the composite in an amount of between about 15 and about 80 percent by volume, and B. a substantially amorphous organic polymer having a glass transition temperature of about 20°C. or less, has a modulus of elasticity of less than about $0.1 \times 10^6$ psi., and which undergoes a substantially residue-free thermal decomposition at temperatures between about 300° and about 800°C.

This invention also provides a process for preparing the composites in which the fiber content is between about 15 and 35 percent by volume, which comprises, in sequence, winding a yarn of the continuous filament polycrystalline refractory oxide fibers on a mandrel to obtain substantially uniaxially aligned yarn, coating one or more layers of the wound yarn with a liquid of the substantially amorphous organic polymer, and at least partially drying the coated layers of yarn.

DESCRIPTION OF THE INVENTION

The continuous filament polycrystalline refractory oxide fibers employed herein are high modulus, high strength fibers containing at least about 60% $Al_2O_3$ by weight and preferably at least about 95% $Al_2O_3$. Preferably also, the $Al_2O_3$ is predominately in the form of alpha alumina. The tensile strength of the fibers is at least about 100,000 lbs./in.² (psi.) and is preferably at least about 200,000 psi. The modulus of the fibers is at least about 35,000,000 psi. and is preferably at least 50 $\times 10^6$. The preparation of these fibers is known in the art, being described in British Pat. No. 1,264,973. The fibers have a diameter of between about 5 and about 50 microns, preferably 15 to 25 microns. The fibers can be coated with a film of about 0.01 to about 1 micron thickness of vitrified silica to impart still greater strength to them. The fibers useful herein can consist solely of the 60 percent or more alumina-containing fibers described above, or they can be a mixture of such aluminacontaining fibers with other refractory oxide fibers provided the alumina content of all the fibers is at least 60 percent by weight. Thus, the fibers can comprise refractory oxide systems such as $Al_2O_3$—$SiO_2$, $Al_2O_3$—$AlPO_4$, $Al_2O_3$—$MgO$, $MgO$, $ThO_2$, $ZrO_2$, $ZrO_2$—$CaO$, $ZrO_2$—$MgO$, $ZrO_2$—$SiO_2$, $Cr_2O_3$, $Fe_2O_3$, $NiO$, $CoO$, $Ce_2O_3$, $HfO_2$, $TiO_2$, and the like. All these fibers should be stable to the temperatures encountered in the thermal decomposition of the organic polymer matrix and the thermal infiltration of metal, and thus should have a melting point of at least 1,000°C. Preferably, the fibers will be employed in the form of yarns containing 50 or more of the continuous filament alumina-containing refractory oxide fibers.

The organic polymer employed herein is one that must be capable of forming a soft, flexible, integral film from a solution, dispersion or melt of the polymer. Organic polymers with such properties are obtained when the polymer has a glass transition temperature of about 20°C. or lower, is substantially amorphous, i.e., less than 10 percent of the polymer is crystalline, and has a modulus of elasticity less than about $0.1 \times 10^6$ psi. In addition, the polymer must undergo a substantially residuefree thermal decomposition at temperatures between about 300° and 800°C. Suitable such polymers include the acrylates, e.g., poly(alkyl acrylates), higher alkyl methacrylates (e.g., $C_4$ to $C_{16}$), acrylamides, polyvinyl ethers, polyoxides such as polyethylene oxide, polysiloxanes, N-alkyl polyamides, and in general the polymers considered as elastomers such as natural rubber, polybutadiene, polyisobutylene, urethane rubbers, and the like. A wide range of copolymers can be used as well as polymers or copolymers containing a plasticizer, and these are encompassed by the term "organic polymer." Glass transition temperatures of organic polymers can be found in "Polymer Handbook" by Brandrupt and Immergut, published by Interscience, Publishers of New York (1967) and in other literature. A preferred polymer, because it produces a soft, flexible film, yet is strong and easy to handle, is polyethylacrylate.

The initial composite can conveniently be made by winding a yarn of the continuous filament alumina-containing polycrystalline inorganic oxide fibers on a rotating mandrel, or drum, in a direction substantially perpendicular to the axis of rotation of the mandrel to give one or several, e.g., 2 or 3, layers of uniaxially aligned yarn; coating the yarn with a liquid of the organic polymer, e.g., a solution, dispersion emulsion or a melt; at least partially drying the coated yarn and repeating the winding, coating and drying steps until the desired thickness is obtained. The resulting composite will be in the form of a continuous sheet. Most conveniently, the organic polymer will be applied from a solvent for the polymer which will evaporate fairly easily at ambient temperatures. A preferred solvent is methyl ethyl ketone when polyethylacrylate is the organic polymer. A 5% solution of the polymer in the solvent is ordinarily employed, although concentrations of 2 to 10 percent may be used. Alternatively, the yarn can be dipped into the liquid containing the organic polymer prior to winding.

The resulting composite is then cut from the mandrel and may be further dried. The coating is applied and drying carried out so as to produce a composite containing from about 15 to about 35 percent by volume of the fibers. The remainder of the composite will be comprised of the polymer, residual solvent and voids. In order to increase the volume percent of the fibers present, this composite can be compressed (hot or cold) to decrease the volume of the voids. Ordinarily, the pressing is accomplished by pressing with plates, or rolling along the axis of the aligned fibers with rollers, or by extruding the soft flexible composite along the axis of the fibers through a die using some of the original organic polymer coating solution as a lubricant. In this manner composites having a fiber content of 80% by volume can be obtained without excessive breakage of the fibers, but a content of not over 70 percent is preferred.

The preparation of the composites of this invention is exemplified by the following embodiment which describes the preferred mode of preparation. The refractory oxide fibers used consist of a yarn containing 60 continuous filaments of polycrystalline alumina having a diameter of about 20 micron with the predominant crystalline phase as detected by X-ray diffraction being alpha alumina. such fibers have a tensile strength of about 180,000 psi. at 1 inch gauge and a Youngs modulus of about $50 \times 10^6$ psi.

Three ends of the above yarn are wound on a card winder (48 inches long by 2.25 inches thick with rounded ends) substantially perpendicular to the axis of rotation of the winder to provide two layers of yarn. The yarn on the winder is coated with about a 5 percent solution of polyethylacrylate in methylethyl ketone to provide about 3 percent polymer (based on total weight of fiber and polymer). The coated yarn is allowed to dry in the air for about 5 minutes. The winding, coating and drying sequence is repeated until a thickness of about 0.3 inch has been obtained. The resulting composite containing about 20 to 25 volume percent fibers on the winder is cut and removed.

The composite is cut in the direction of the fiber length into strips of 0.9 inch width $\times$ 44 inches long and three strips placed together to form a preform of approximately square cross-section weighing about 750 grams. This is lightly coated with the polymer solution above and rolled into a circular cross-section with the axis of rotation parallel to the fiber axis. This initial preform of about 1.5 inches diameter is wrapped in a thin film of Teflon and consolidated by extruding through seven stages of dies (using the polymer solution as a lubricant) to yield a final consolidated preform of 0.7 inch diameter containing about 65 volume percent fibers.

The composites of this invention are easily handled and stored, and can be molded into all manner of odd and normal shapes without fiber breakage. They are particularly well suited for the preparation of fiber-reinforced metal composites. A suitable process for the preparation of such reinforced metal composites consists of (1) loading a mold with the composite (preform) of this invention, (2) removing the organic polymer by thermal decomposition, (3) separating and distributing the remaining fiber skeleton, and infiltrating the fiber skeleton with a suitable molten metal. This utility is demonstrated as follows employing the alumina fiber/polyethylacrylate preform prepared as described above. The consolidated preform is coated with the polyethylacrylate solution as a lubricant, and is drawn by vacuum into a quartz tube of 0.75 inch I.D. having an extended connecting tube (ca ½ inch $\times$ 20 inches) on one end. This mold containing the preform is placed in a closed furnace with the one end of the mold open to the oven atmosphere and the connecting extended end connected to vacuum. Air at about 20 psi. is fed to the oven. The mold is heated under these conditions at 600°C. for 4 hours and cooled. The fibers are white. The white polycrystalline alumina fibers remaining are rinsed with acetone and dried. The fibers are separated and distributed uniformly in the mold by holding the mold in a vertical position against a vertical rod-type vibrator (Type EI made by A. G. Fuer Chemie-Apparatebau Zuerich). The open end of the mold is reduced in size and joined to a ¼ inch tube which is then bent at 90° to the mold axis.

The mold is placed in an electric furnace with the bent tube below the surface of a melt of commercial purity magnesium (ca 99.7 percent) at about 700°C. After heating the mold for 30 minutes sufficient magnesium is drawn by vacuum to fill part of the vertical feed tube and that tube chilled to freeze the magnesium. The mold and contents are then evacuated to about 750 mm. of Hg for 15 minutes to remove all gases. The entrance tube is then heated to melt the magnesium plug and a vacuum of about 500 mm. Hg used to infiltrate the fibers (heated to 700°C.) with the magnesium. The current to the electric furnace is shut off and the mold and contents cooled. The quartz mold breaks away from the composite on cooling. Metallographic examination of a cut cross-section does not show any porosity. The composite shaft with a density of about 0.105 lbs./in.$^3$ has a distinct metallic sound when tapped with a metal bar. The resulting fiber reinforced magnesium composite is useful in any ordinary application where magnesium metal of high strength is desirable.

The preceding representative examples may be varied within the scope of the present total specification disclosure, as understood and practiced by one skilled in the art, to achieve essentially the same results.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. A flexible, integral sheet of a composite consisting essentially of
   A. continuous filament polycrystalline refractory oxide fibers containing at least about 60% $Al_2O_3$ by weight and which have a fiber diameter of between about 5 and about 50 microns, said fibers being substantially uniaxially aligned in the composite and being present in the composite in an amount of between about 15 and about 80 percent by volume, and
   B. a substantially amorphous organic polymer having a glass transition temperature of about 20°C. or less, has a modulus of elasticity of less than about $0.1 \times 10^6$ psi., and which undergoes a substantially residue-free thermal decomposition at temperatures between about 300° and about 800°C.

2. The sheet composite of claim 1 wherein the $Al_2O_3$ in the fibers is predominately alpha alumina.

3. The sheet composite of claim 2 wherein the organic polymer is polyethylacrylate.

4. The sheet composite of claim 2 wherein the fibers have a tensile strength of at least about 100,000 psi. and a modulus of at least about 35,000,000 psi.

5. The sheet composite of claim 2 wherein the fibers are coated with a film of vitrified silica about 0.01 to about 1 micron thick.

6. The sheet composite of claim 5 wherein the organic polymer is polyethylacrylate.

7. The sheet composite of claim 2 wherein the $Al_2O_3$ content is at least 95 percent by weight.

8. The sheet composite of claim 7 wherein the organic polymer is polyethylacrylate.

9. Process for preparing a sheet composite which comprises, in sequence, winding a yarn of continuous filament polycrystalline refractory oxide fibers on a mandrel to obtain substantially aligned yarn, said fibers containing at least about 60% $Al_2O_3$ by weight and having a fiber diameter of between about 5 and about 50 microns; coating one or more layers of the wound yarn with a liquid containing a substantially amorphous organic polymer having a glass transition temperature of about 20°C. or less and a modulus of elasticity of less than about $0.1 \times 10^6$ psi., and which undergoes a substantially residue-free thermal decomposition at temperatures between about 300° and about 800°C.; and at least partially drying the coated layers of yarn.

10. The process of claim 9 wherein the $Al_2O_3$ in the fibers is predominately alpha alumina, and the organic polymer is polyethylacrylate.

* * * * *